United States Patent
Hale et al.

(10) Patent No.: US 8,526,580 B2
(45) Date of Patent: Sep. 3, 2013

(54) SYSTEM AND METHOD FOR VOICEMAIL ORGANIZATION

(75) Inventors: Kelly Hale, Dana Point, CA (US); Jes Thyssen, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1789 days.

(21) Appl. No.: 11/513,773

(22) Filed: Aug. 31, 2006

(65) Prior Publication Data

US 2008/0075244 A1    Mar. 27, 2008

(51) Int. Cl.
*H04M 11/00* (2006.01)
*H04W 4/00* (2009.01)

(52) U.S. Cl.
USPC ............... 379/88.13; 379/67.1; 379/88.11; 379/88.14; 379/88.23; 455/414.1; 455/414.3; 455/466; 704/260

(58) Field of Classification Search
USPC ............ 379/88.11, 88.14, 88.16, 88.17, 88.2, 379/88.25, 67.1, 88.13, 88.23; 709/206; 455/413, 466, 556.2, 414.1; 704/260
See application file for complete search history.

(56) References Cited

U.S. PATENT DOCUMENTS

| | | | | |
|---|---|---|---|---|
| 5,737,394 A * | 4/1998 | Anderson et al. | ......... | 379/88.11 |
| 6,411,685 B1 * | 6/2002 | O'Neal | ............ | 379/88.14 |
| 6,507,643 B1 * | 1/2003 | Groner | ............ | 379/88.14 |
| 6,532,370 B1 * | 3/2003 | Underbrink et al. | ....... | 455/552.1 |
| 6,704,394 B1 * | 3/2004 | Kambhatla et al. | .......... | 379/67.1 |
| 7,184,786 B2 * | 2/2007 | Mumick et al. | ............... | 455/466 |
| 7,359,493 B1 * | 4/2008 | Wang et al. | ............... | 379/88.23 |
| 7,548,858 B2 * | 6/2009 | Wang | ........... | 704/260 |
| 7,996,023 B2 * | 8/2011 | McGary et al. | ............... | 455/466 |
| 8,064,889 B2 * | 11/2011 | Griswold et al. | .......... | 455/414.1 |
| 2003/0128820 A1 * | 7/2003 | Hirschberg et al. | ....... | 379/88.14 |
| 2006/0234680 A1 * | 10/2006 | Doulton | ............ | 455/412.1 |
| 2007/0038443 A1 * | 2/2007 | Thyssen et al. | ............... | 704/233 |
| 2007/0047726 A1 * | 3/2007 | Jabbour et al. | ........... | 379/373.02 |
| 2007/0117543 A1 * | 5/2007 | Doulton | ............ | 455/413 |
| 2007/0155411 A1 * | 7/2007 | Morrison | ............ | 455/466 |
| 2007/0280433 A1 * | 12/2007 | Milstein et al. | ............ | 379/67.1 |
| 2008/0005691 A1 * | 1/2008 | Malik et al. | ............ | 715/765 |
| 2008/0075244 A1 * | 3/2008 | Hale et al. | ............ | 379/88.13 |
| 2009/0003540 A1 * | 1/2009 | Zafar | ............ | 379/88.11 |
| 2009/0252305 A1 * | 10/2009 | Rohde et al. | ............ | 379/88.13 |
| 2010/0184409 A1 * | 7/2010 | Doulton | ............ | 455/412.1 |
| 2011/0294477 A1 * | 12/2011 | McGary et al. | ............ | 455/414.3 |

* cited by examiner

*Primary Examiner* — Gerald Gauthier
(74) *Attorney, Agent, or Firm* — McDermott Will & Emery LLP (57) ABSTRACT

A stream of voicemail audio data is received. A text-based representation of a portion of the stream of voicemail audio data is generated. One or more identification tags from the stream of voicemail audio data and/or the text-based representation of the portion of the stream of voicemail audio data are obtained from a first user. The text-based representation of the portion of the stream of voicemail audio data and the one or more identification tags are provided to a second user through a graphical user interface.

24 Claims, 7 Drawing Sheets

SYSTEM AND METHOD FOR VOICEMAIL ORGANIZATION

TECHNICAL FIELD

This description relates to voicemail and media mail systems.

BACKGROUND

Voicemail systems typically operate when a first person attempts to contact a second person though an audio communication link (e.g., a telephone line) but is unable to contact the second person. Using the voicemail system, the first person can input a stream of audio data into a recording system that converts the audio data into digital and/or analog signals that are stored as a message for later retrieval and playback by the second person.

Extracting valuable content from a number voicemail messages can be difficult at times. For example, when the second person receives a large number of voicemail messages in a relatively short time person it may be impractical to listen to each voicemail message, or the second person may delay listening to the messages until an opportune time, such that time-sensitive information in messages cannot be acted upon. Thus, the person may ignore some or all voicemail messages, or the content of the sender's message may never reach the second person. Furthermore, some voicemail messages can be very long, and the important content of the message may be buried near the end of the message, or interspersed throughout the message, such that the important content of the message may be difficult to ascertain in a short amount of time. Additionally, cumbersome user interfaces with voicemail systems may render the systems ineffective, especially for users who receive a large volume of voicemail messages.

SUMMARY

According to one general aspect, a method includes receiving a stream of voicemail data. A text-based representation of a portion of the stream of voicemail data is generated. One or more identification tags from the stream of voicemail data and/or the text-based representation of the portion of the stream of voicemail data are obtained from a first user The text-based representation of the portion of the stream of voicemail data and the one or more identification tags are provided to a second user through a graphical user interface.

According to another general aspect, a system includes a processor and a graphical user interface (GUI). The processor is configured for (i) receiving a stream of voicemail audio data associated with a voicemail message created by a first user, (ii) generating a text-based representation of a portion of the stream of voicemail audio data, (iii) obtaining one or more identification tags from at least one of the stream of voicemail data and the text-based representation of the portion of the stream of voicemail data. The GUI is configured for providing the text-based representation of the data and the one or more identification tags to a second user.

According to another general aspect, a computer-readable program includes computer-executable instructions for causing a computer to receive a stream of voicemail audio data associated with a voicemail message created by a first user, generate a text-based representation of a portion of the stream of voicemail audio data, obtain one or more identification tags from at least one of the stream of voicemail data and the text-based representation of the portion of the stream of voicemail data, and provide the text-based representation of the portion of the stream of voicemail data and the one or more identification tags to a second user through a graphical user interface.

The details of one or more implementations are set forth in the accompanying drawings and the description below. Other features will be apparent from the description and drawings, and from the claims.

DETAILED DESCRIPTION

Figure 1:
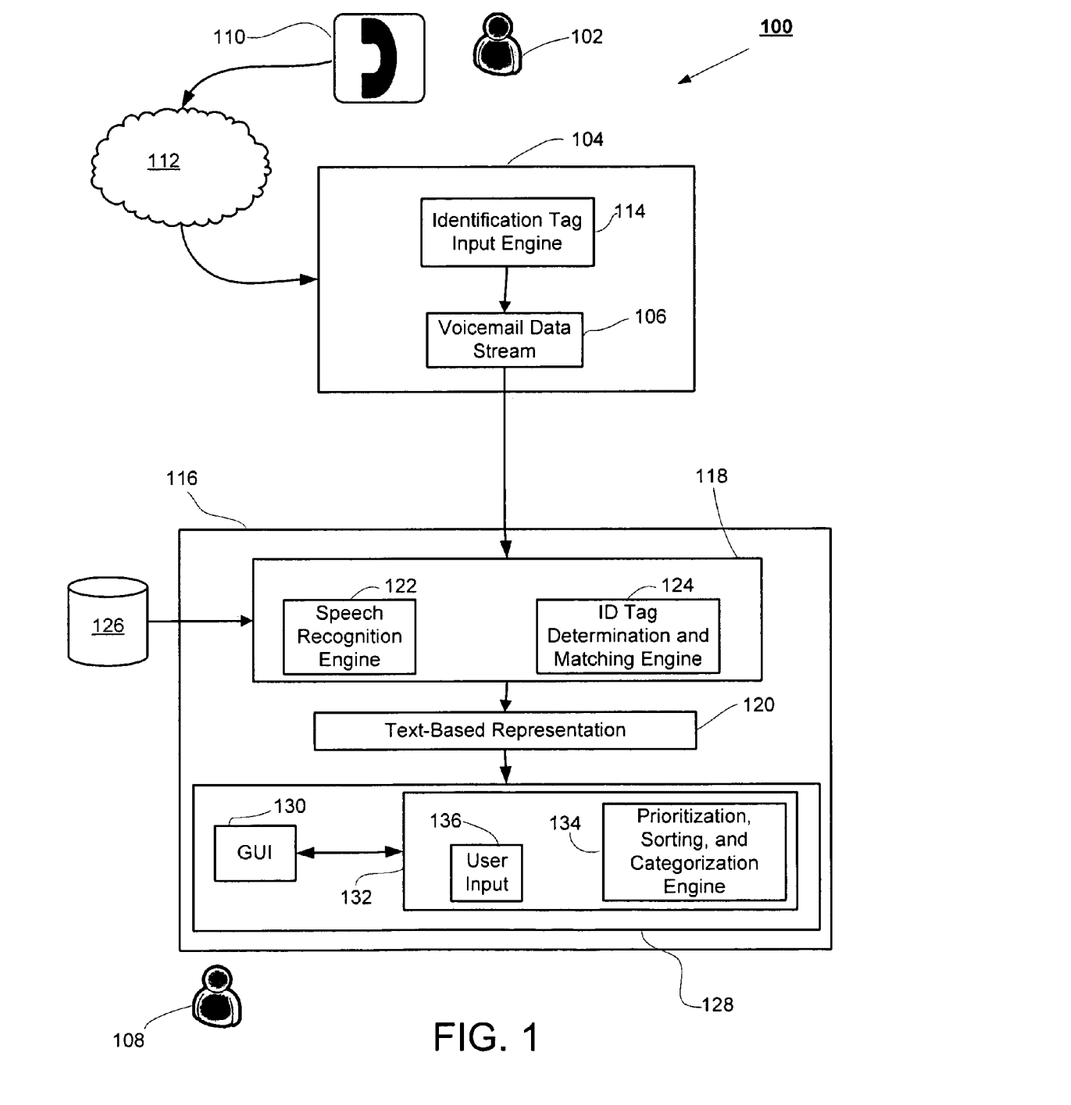
FIG. 1 is a schematic block diagram of a voicemail organization system.

FIG. 1 is a block diagram of a voicemail organization system 100. In the system 100, a first user 102 can use a voicemail input system 104 to generate a voicemail data stream 106 that can be stored for later retrieval and playback by a second user 108. The first user 102 can access the voicemail input system 104 by communicating though an input device 110 that is operatively connected to the voicemail input system 104. For example, the input device 110 can be a telephone (e.g., a mobile telephone or a fixed telephone) that is connected to the input system 104 through a telecommunications network 112 (e.g., a wireless network, a wired network, or a combination of a wireless and a wired network). In another implementation, the input device 110 can be a computer or a processing device that includes a microphone through which the first user can communicate with the input system 104. For example, the input device 110 can be a personal computer connected to the input system 104 through a voice over Internet protocol (VOIP) network. The input system 104 can be part of the telecommunications network 112 or can be separate from the network.

The input system 104 can include an identification tag input engine 114 for adding identification tags to the voicemail data stream 106. The identification tags may be used to provide metadata about the voicemail data stream 106 and can include information about, for example, a name of the first user, a data, time, or subject of the content of the voicemail stream, and a return phone number of the first user. When the first user 102 communicates with the input system to leave a voicemail message for a second user 108, the identifier engine 114 of the input system 104 can provide one or more voice prompts to the first user to induce the user to enter audio information that may be used to generate one or more identification tags that can be associated with the voicemail data stream 106. For example, the engine 106 may prompt the user 102 to enter his/her name, return phone number, a short (e.g. five seconds of less) subject or title of the voicemail message, a date and time of the message, or other information. If the first user answers the questions, the identification tag input system 104 may associate the first user's answers into the voicemail data stream 106.

The system 100 can also include a message processing and presentation system 116 configured for additional processing of the voicemail data stream 106 and presentation of the message to the second user 108. The processing and presentation system 116 can be co-located with the input system 104. For example, the processing and presentation system 116 and the input system can both be part of a network provided by a telecommunication provider (e.g., Sprint, MCI, AT&T, Verizon). Alternatively, the processing and presentation system 116 can be located remotely from the input system 104, in which case the voicemail data stream 106 can be transmitted from the input system 104 to the processing and presentation system 116. For example, the processing and presentation system 116 may be implemented within a system located on a local server or within a local area network (LAN) that receives voicemail data streams 106 from a network that hosts the input system 104.

The message processing and presentation system 116 can include, for example, a text-based representation generator 118 that is adapted to receive the voicemail data stream 106 and output a text-based representation 120 of at least a portion of the voicemail data stream 106. The text-based representation generator 118 can include a speech recognition engine 122 that receives the voicemail data stream 106 and can convert at least a portion of the stream into textual information that can be displayed to the second user 108.

The text-based representation generator 118 also can include an identification tag determination and matching engine 124 that, as described in more detail below, can automatically generate identification tags corresponding to metadata information about the voicemail data stream 106 and associate the identification tags with the voicemail data stream 106 or that can match information in the stream 106 or in the text-based representation 120 of the stream with identification tags. The text-based representation generator 118 can be coupled to a database 126 that can store information that can be matched to information in the voicemail data stream to generate one or more identification tags. For example, the database 126 can store the names and contact information of a number of people with whom the second user has interacted. Then, the matching engine 124 can compare information in the text-based representation 120 to information in the database, and can generate identification tags based on matches that are found during the comparison. For example, to generate an identification tag that includes information about the first user's name, the matching engine 124 may extract information from the data stream 106 about the telephone number from which the call originated and can search for a match between the extracted telephone number and a telephone number stored in the database 126. If a match is found, and a name is associated with a matching phone number in the database, then the associated name may be selected automatically as an identification tag that includes information about the first user's name. Thus, if the first user 102 bypassed or did not respond to voice prompts for his/her name, the matching engine 124 may extract this information automatically based on other information in the data stream 106.

The matching engine 124 also may provide additional information to the second user 128. For example, if the database 126 contains additional information associated with a matching phone number (e.g., an e-mail address, a street address, an image of the first user 126, an internet URL for the first user 126, etc.), this additional information can be associated with the voicemail data stream 106 when the voicemail data stream 106 is routed to the second user.

If the first user 102 does not answer voice prompts for particular information to be used as identification tags with the data stream, or if the speech recognition engine 122 does not understand the user's answers, the identification and matching engine 124 may attempt to ascertain relevant identification tags automatically by determining if the text-based representation 120 of the voicemail data stream includes information about any of the one or more identification tags that could be associated with the voicemail message when presented to the second user. For example, when attempting to determine the name of the first user automatically, the identification engine 124 can scan the text-based representation 120 and search for matches between text within the representation 120 and names stored in the database 126. In another implementation, the engine 124 can determine the name of the first user based on contextual information in the data stream. For example, certain keywords or key phrases may indicate that a proximate word is a name and/or the beginning of an appropriate subject for the voicemail message. The text-based representation 120 may include keywords or key phrases such as, "it's", "this is", "I am", "my name is", and similar keywords indicative that a name will follow the keyword or key phrases. The representation 120 can also include keywords or key phrases, such as "I am calling about", or "the reason I called", that are indicative of a subject identification tag that is proximate to the keywords or key phrases.

If the system is unable to ascertain an identification tag corresponding to a subject of the voicemail data stream 106 through the first user's response to one or more voice prompts or by scanning the text-based representation 120 for subject matter keywords, then the speech recognition engine 122 and the identifier engine 124 may work in consort with each other to generate automatically a subject identification tag. For example, a first portion of the data stream 106 can be converted by the speech recognition engine into a first portion of the text-based representation 120, and the first portion of the text-based representation can be defined by the identifier engine 124 as the subject identification tag. For example, the first few words, the first sentence, the first paragraph, or the first few seconds of the data stream can be defined as the subject identification tag.

The text-based representation 120 of the voicemail data stream, along with associated identification tags, can be provided to a display system 128 in the message processing and presentation system 116. The display system 128 may be responsible for the presentation, through a graphical user interface (GUI) 130, of the information about voicemail messages received by the second user 108. Some or all of the GUI 130 may include a media mail system 132 (e.g., an e-mail system, an instant messaging system, an online communication community, or a text messaging system) that can be either internal or external to the message processing and presentation system 116. The media mail system 132 may be a locally-executed program, such as Microsoft Outlook or Lotus, or it may be a remotely-provided or web-based program system, such as, gmail or hotmail. The media mail system furthermore may be an instant messaging system, or it may be a component of an online collaboration and communication community, such as, MySpace, for example. The media mail system 132 can also include a prioritizing, sorting, and categorizing engine 134 adapted for determining how the GUI 130 appears to the second user 128, and a user input block 136, through which the second user can access and/or customize the GUI 130. As described in more detail below, the GUI 130 may provide information about voicemail messages received by the second user, where the information can include information contained in identification tags associated with the voicemail message. The user input block 136 can be used by the second user 124, for example, to view and modify information about voicemail messages, to delete messages, to categorize messages, and to prioritize messages. The prioritizing, sorting, and categorizing engine 134 may be used, for example, in conjunction with the user input block 136 or the text-based representation generator 118 to organize the information about a number of voicemail messages, including information about identification tags associated with the messages, in an effective manner for the second user 108.

Figure 2:
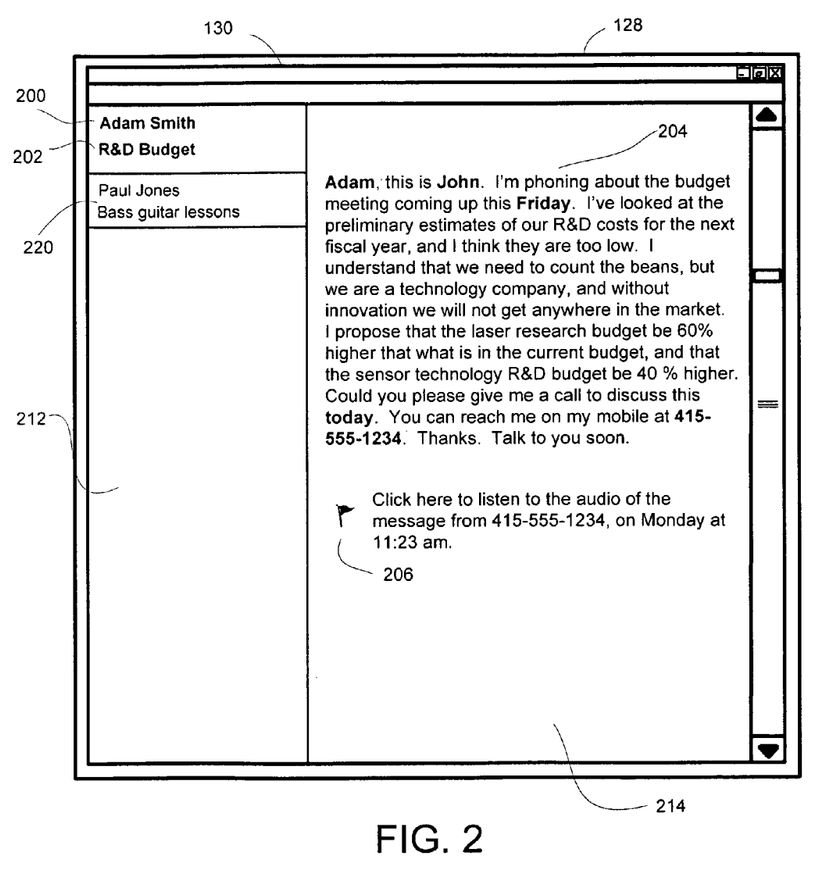
FIG. 2 is a schematic diagram of a graphical user interface adapted for use with a voicemail organization system.

FIG. 2 is a schematic block diagram of a graphical user interface 130 that may be used in a voicemail organization system 100. The graphical user interface 130 may be included in a display system 128 and may be designed to show a user a media mail system 132. The media mail system 132 may be configured to receive data, such as audio data of the voice mail data stream, identification tags associated with the data stream, and the text-based representation 120 of a voicemail data stream. The information for display can include, for example, a name 200, a subject 202, a text message 204, and a representation of the audio message 206 that can be, for example, clicked to play the audio message.

In the text message 204, certain words or phrases can be highlighted to draw the attention of the second user. For example, phone numbers, names, and words and phrases associated with dates can be highlighted. Automatic highlighting of certain words and phrases may allow the second user to scan the text message 206 more efficiently or quickly.

Identification tags associated with the voicemail data stream 106 (e.g., the name of the caller 200) may be obtained from the voicemail message in one or more of a number of methods. For example, the name 200 may be input explicitly in response to a voice prompt to the caller. In another implementation, the name 200 may determined via a database using a matching process to find information about the caller in the database. For example the caller's telephone number may be matched with a name in an address book. In another implementation, the name 200 may be determined by keyword or other scanning of the text-based representation 120. Similarly, the subject identification tag 204 may be obtained in a manner similar to the manner in which the name is obtained 200.

The name 200 and the subject 202 associated with a voicemail message may be arranged with a plurality of other names and subjects associated with other messages 220 as lines or entries in a first portion of the GUI 130. The text message 204 may be an on-screen print out of the text-based representation 120, or a portion of the representation, or a link to a location where the representation may be found. The audio message 206 may include a link to a file that allows the user to listen to the actual message, for instance, as an audio and/or video, file in a format (e.g., wav, mp3, mpeg) that can be played by the user's computer environment. The text message 204 and the audio message 206 may relate to and/or be associated with the highlighted line or entry in the first portion of the GUI 130. The text message 204 and the audio message 206 may be provided and/or displayed in a second portion 214 of the GUI 130.

Figure 3A:
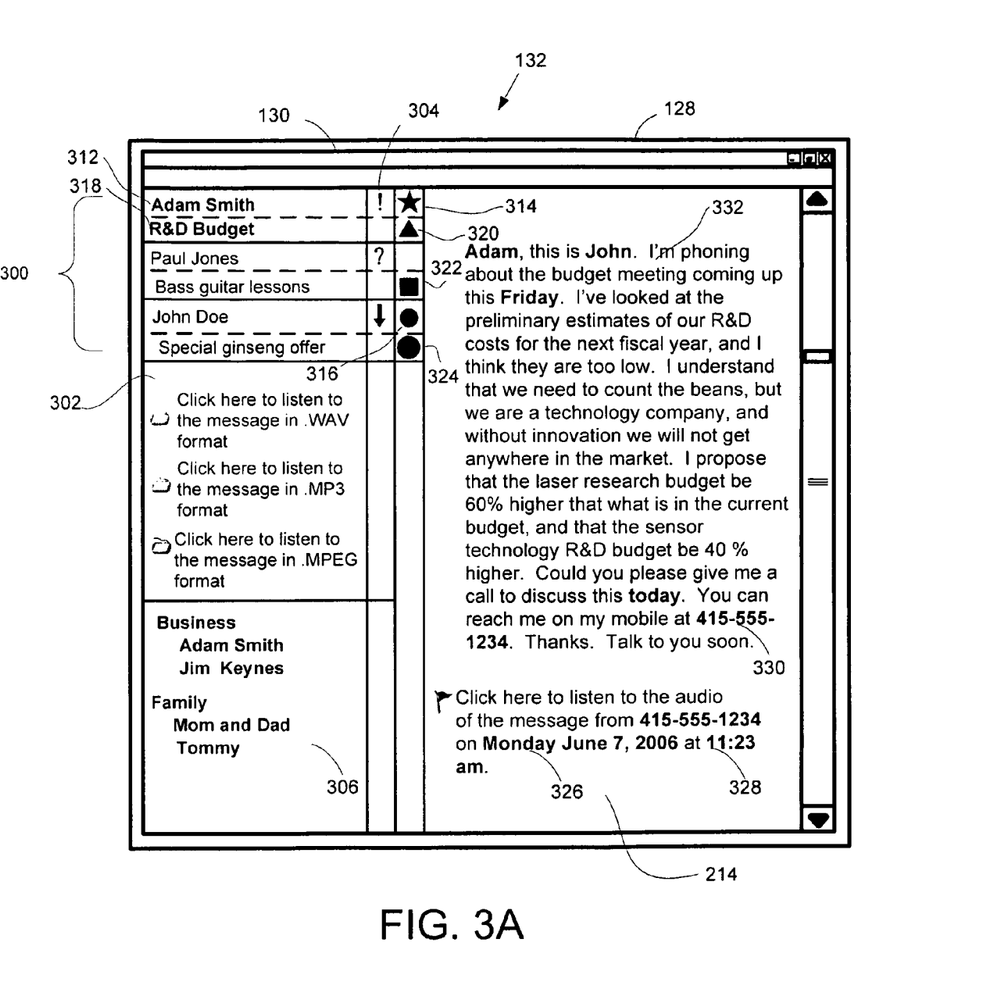
FIG. 3A is a schematic diagram of another graphical user interface adapted for use with a voicemail organization system.

FIG. 3A is a schematic diagram of a graphical user interface 130 that may be used in a voicemail organization system 100. The graphical user interface 130 may be included in a display system 128 and may be designed to show a user a media mail system 132. The media mail system 132 may be configured to receive data, such as the voicemail data stream 106, identification tags associated with the data stream, and the text-based representation 120, as described with respect to FIG. 1. The text-based representation 120 may be used to generate information on the display system 128, which can be divided into various sections that present different information to a user. For example, the representation 120 can allow the user to view information in a message section 300, a format section 302, a priority section 304, and a category section 306. The message section 300 can include information associated with a voicemail data stream, for example, a name 312 and a subject 318 of the message. The name 312 may be associated with a name-via-a-prompt icon 314 or a name-via-text-based-representation icon 316. By associating a name-via-a-prompt icon 314 with a name 312, the user may be informed that the name of the caller who left the message was determined through information gleaned from the caller responding to a prompt to leave his or her name. By associating a name-via-text-based-representation icon 316 with a name, the user may be informed that the name of the caller who left the message was determined by a software program that searched the message left by the caller for the name of the caller. The subject section 318 may include a subject-via-prompt icon 320, and a subject-via-text-based representation icon 322, and a default subject icon 324.

These icons can inform the user about the trustworthiness of the textual information that has been extracted from a voice message. For example, if a name 312 is listed, and the icon 314 associated with the name indicates that it was found via a prompt, the user may be more certain that the name is accurate than if the name was determined by a text search of the message. The GUI 130 further may include a date section, a time section, and a return phone number section, which can be used to display the date of the message 326, the time of the message 328, and a return phone number of the caller who left the message 330. In another example, if a subject 318 is listed, and the icon 314 associated with the name 312 of the caller who left the message indicates that the caller's name was found via a voice prompt, then the user can be relatively certain that the action the user needs to take in response to the message is valid even if the user does not have time to listen to the entire audio message. Similarly, if the user receives a message and an icon 324 associated with the message indicates that the message was determined to be spam because it pertains to a topic frequently addressed in spam messages then the user can know that he or she need not listen to the entire message or take an action in response to the message.

The graphical user interface 130 may include a message section 300 in which multiple messages in the user's voicemail can be listed. The voicemail messages in the message section 300 can be associated with other information, such as, for example, the caller, the caller's telephone number, or the topic of the caller's message. When a specific message in the section is highlighted (e.g., the message identified by the name 312 and the topic 318), the contents 332 of that message may be expanded and shown in more detail. The format section 302 may be a component of the highlighted message shown in more detail or it may be a component of a toolbar. The format section 302 may provide the user with the option of rendering the message in a number of different manners and/or formats. For example, the user may have the option to read the text-based version of the message, or to listen to an audio version of the message in a number of formats, such as .wav, .mp3, or mpeg.

The priority section 304 of the GUI 130 may be a separate section or it may be integrated into the message section 300, for example, via the use of icons, such as an "urgent" icon (e.g., an exclamation point) to indicate that a particular message has (or should have) a relatively higher priority for the user. The priority status of the messages can be determined by the first user, the second user or automatically by the system. For example, the first user 102 can respond to a voice prompt to indicate a desired priority status of the message (e.g., high, normal, low). Also, the identification tag determination engine 124 can assign a priority status automatically to the message based on information in the text-based representation 120. For example, if the word "urgent" appears in the representation 120, the engine 124 can assign a high-priority status to the message. Also, the second user 108 may assign a particular priority status to messages based on the identity of the first user or the telephone number from which the call originates. The icons may be located as a part of, or be associated with, each message in a list of messages. The category section 306 may be a separate option or a part of a toolbar that allows the user to categorize and sort messages. Thus, the second user 128 may create categories for messages, for example, "business" and "personal," then the prioritizing, sorting, and categorizing engine 110 can sort the messages appropriately based on the category to which they belong. For example, selecting a "business" link may cause all messages from business associates to be displayed.

Figure 3B:
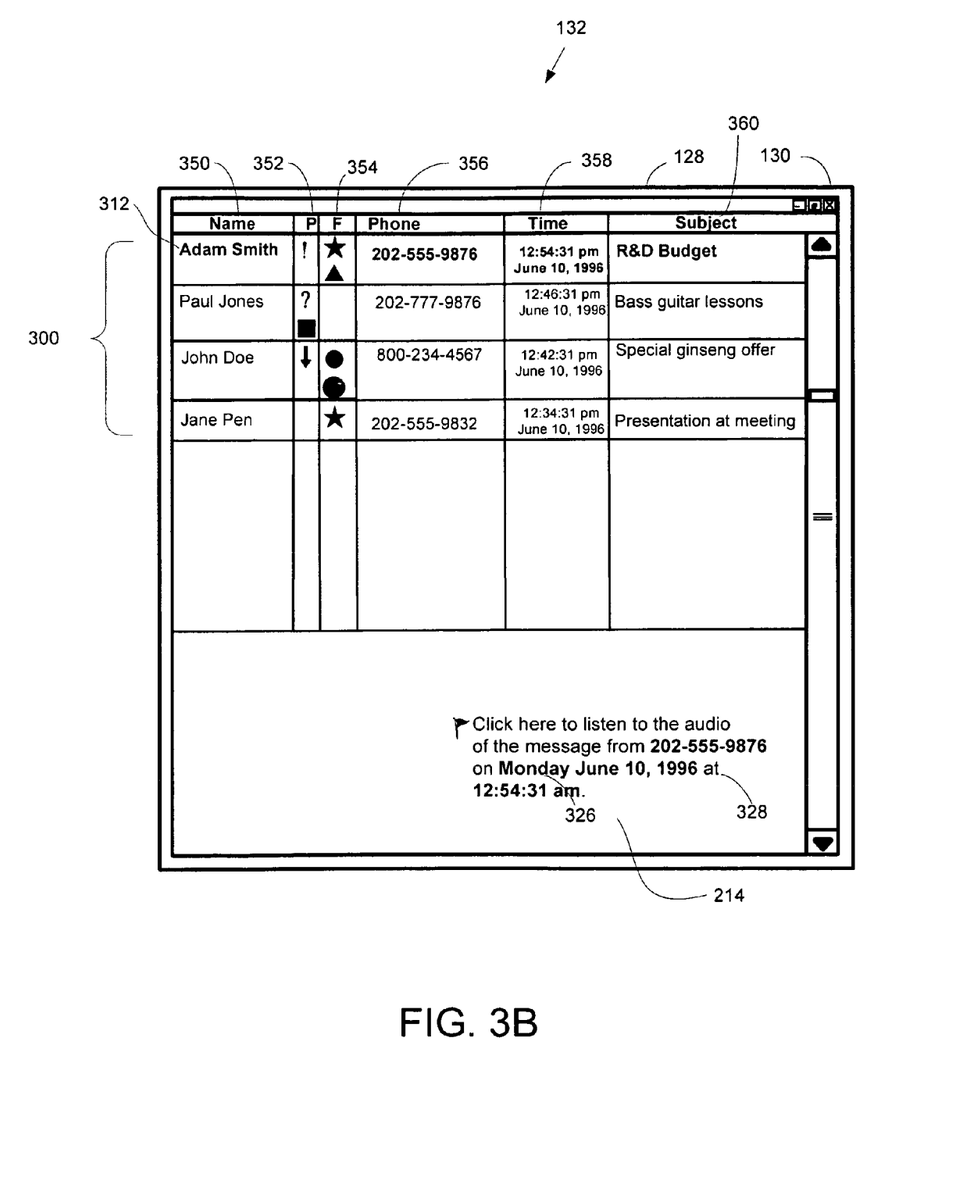
FIG. 3B is a schematic diagram of another graphical user interface adapted for use with a voicemail organization system.

FIG. 3B is a schematic diagram of another implementation of the graphical user interface 130 that may be used in a voicemail organization system 100. In this implementation, information about multiple voicemail messages can be presented to the user though the GUI 130. For example, the GUI can include columns in which various information about each voicemail message can be presented to the user. The columns can include information about the name of caller 350, the priority of the message 352, the format in which one or more identification tags associated with the message were extracted from the message 354, a phone number associated with the caller 356, the time of the call 358, and the subject of the caller's call 360. A user may use the GUI 130 to organize and sort a plurality of voicemail messages. For example, the user can sort the multiple voicemail messages according to different information associated with the messages. Thus, for example, the user may select (e.g., by clicking on) the heading of a column in the GUI to sort the messages according the information in the column. Thus, for example, the user may select the "time" heading to sort all the voicemail messages by the name of the person who placed the call or may select the "P" heading to sort all the voicemail messages by the priority level of the messages.

In another implementation, the user may edit the information in identification tags associated with a voicemail message. For example, the user may edit the subject of the user's message to provide a subject line identifier that is more useful to the user than the one provided automatically to the user. Then, when the user stores the voicemail message for a relatively long time period the user a clear and easily-remembered subject identifier to provide summary information about the content of the voicemail message. In another implementation, the user may associate a high priority icon with every message received from a particular person or a particular telephone number and may set up the system such that high priority messages are always listed first. Thus, a user may require that the prioritizing, sorting, and categorization engine 134 automatically associate a high-priority icon with messages received from his supervisor. Then by also requiring that high priority messages are displayed most prominently in the GUI, the user can ensue that messages from his supervisor are displayed prominently, e.g., at the top of the list of messages.

Figure 4:
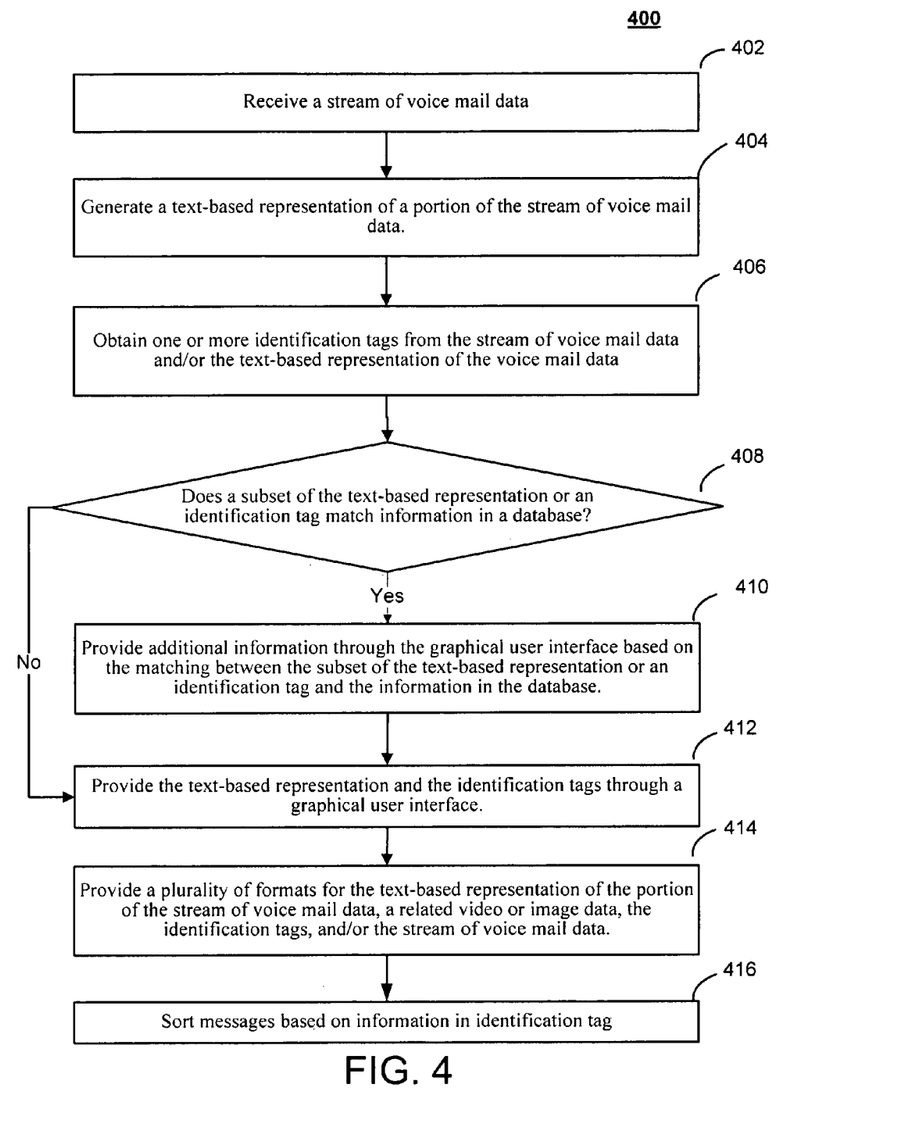
FIG. 4 is a flowchart of a process for organizing a plurality of voicemail messages.

FIG. 4 is a flowchart of a process 400 that may be used in a voicemail to media mail forwarding system. In the process a stream of voicemail data is received (402). A text-based representation of a portion of the stream of voicemail data can be generated (404). One or more identification tags from the stream of voicemail data and/or the text-based representation of the portion of the stream of voicemail data can be obtained (406). At a decision (408), it can be determined if a subset of the text-based representation or the identification tags match information in a database. If so, additional information can be provided through the graphical user interface based on the matching between the subset of the text-based representation or the identification tags and the information in the database (410).

If the decision (408) is negative or after the operation (410), the text-based representation and the identification tags are provided through a graphical user interface (412). In addition, a plurality of formats may be optionally provided for the text-based representation of the portion of the stream of voicemail data, a related video or image data, the identification tags, and/or the stream of voicemail data (414). Using the identification tag, a user can sort messages to prioritize the display of messages based on information in the identification tags (416).

Figure 5:
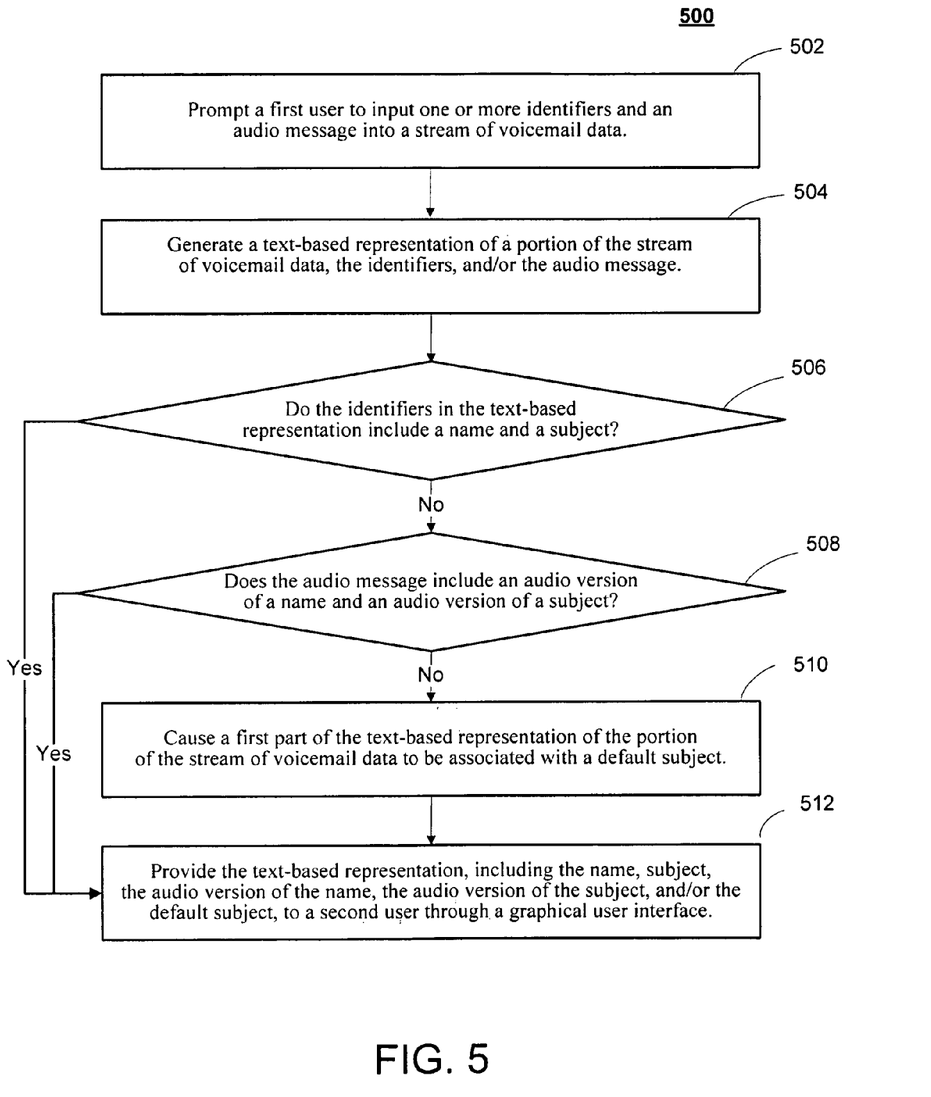
FIG. 5 is a flowchart of another process for organizing a plurality of voicemail messages.

FIG. 5 is another flowchart of a process 500 that may be used in a voicemail to media mail forwarding system. A first user can be prompted to input one or more identification tags and an audio message into a stream of voicemail data (502). A text-based representation of a portion of the stream of voicemail data, the identification tags, and/or the audio message can be generated (504). At a decision (506), it can be determined if the identification tags in the text-based representation include a name and a subject.

If not, it can be determined at a decision (508) whether the audio message includes an audio version of a name and an audio version of a subject. If not, a first part of the text-based representation of the portion of the stream of voicemail data can be associated with a default subject (510). If the answer after the decision (506) or the decision (508) is yes, or after the operation (510), the text-based representation, including the name, subject, the audio version of the name, the audio version of the subject, and/or the default subject, can be provided to a second user through a graphical user interface.

Figure 6:
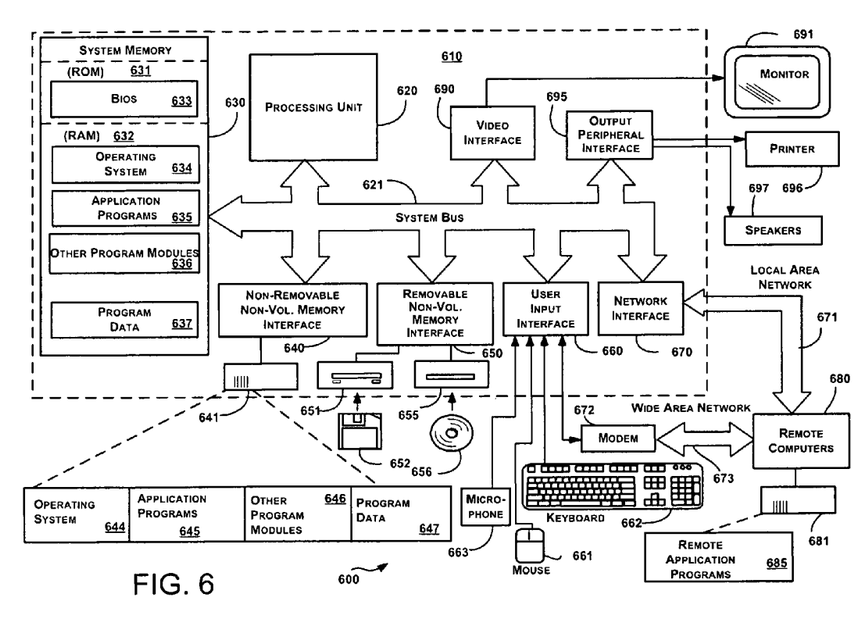
FIG. 6 is a block diagram of a system for organizing a plurality of voicemail messages.

FIG. 6 is a block diagram of a system 600 in which a voicemail to media mail forwarding system may be implemented. The system 600 may be considered to have similar characteristics and/or capabilities to the message processing and presentation system 116 of FIG. 1. FIG. 6 illustrates an example electronic device that may correspond in whole or part to a general-purpose computing device, and is shown as a computing system 600. Components of the computing system 600 may include, but are not limited to, a computing device 610 having a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system 600 typically includes a variety of computer-readable media products. Computer-readable media may include any media that can be accessed by the computing device 610 and include both volatile and nonvolatile media, removable and non-removable media. By way of example, and not of limitation, computer-readable media may include computer storage media and communications media used with voicemail data streams, audio data and messages, text-based representations of portions of the streams, or messages, and the like.

Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 610.

Communications media typically embody computer-readable instructions, data structures, program modules, or other data (like voicemail and representations of voicemail in text) in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 630 includes computer storage media in the form of volatile and nonvolatile memory such as ROM 631 and RAM 632. A basic input/output system (BIOS) 633, containing the basic routines that help to transfer information between elements within the computing device 610, such as during start-up, is typically stored in ROM 631. RAM 632 typically contains data and program modules that are immediately accessible to or presently being operated on by processing unit 620. By way of example, and not limitation, FIG. 6 illustrates an operating system 634, application programs 635, other program modules 636, and program data 637. Often, the operating system 634 offers services to applications programs 635 by way of one or more application programming interfaces (APIs) (not shown). Because the operating system 634 incorporates these services, developers of applications programs 635 need not redevelop code to use the services. Examples of APIs provided by operating systems such as Microsoft's "WINDOWS" are well known in the art.

The computing device 610 may also include other removable/non-removable, volatile/non-volatile computer storage media products. By way of example only, FIG. 6 illustrates a non-removable non-volatile memory interface (hard disk interface) 640 that reads from and writes to non-removable, non-volatile magnetic media, a magnetic disk drive 651 that reads from and writes to a removable, non-volatile magnetic disk 652, and an optical disk drive 655 that reads from and writes to a removable, non-volatile optical disk 656 such as a CD ROM. Other removable/non-removable, volatile/non-volatile computer storage media that can be used in the example operating environment include, but are not limited to, magnetic tape cassettes, flash memory cards, DVDs, digital video tape, solid state RAM, and solid state ROM. The hard disk drive 641 is typically connected to the system bus 621 through a non-removable memory interface, such as the interface 640, and magnetic disk drive 651 and optical disk drive 655 are typically connected to the system bus 621 by a removable non-volatile memory interface, such as interface 650.

The drives and their associated computer storage media discussed above and illustrated in FIG. 6 provide storage of computer-readable instructions, data structures, program modules, and other data for the computing device 610. In FIG. 6, for example, hard disk drive 641 is illustrated as storing an operating system 644, application programs 645, other program modules 646, and program data 647. Note that these components can either be the same as or different from the operating system 634, application programs 635, other program modules 636, and program data 637. The operating system 644, application programs 645, other program modules 646, and program data 647 are given different numbers here to illustrate that, at a minimum, they are different copies. A user may enter commands and information into the computing device 610 through input devices such as a microphone 663, keyboard 662, and pointing device 661, commonly referred to as a mouse, trackball, or touch pad. Other input devices (not shown) may include a telephone, cellular phone, voice over IP phone, joystick, game pad, satellite dish, and scanner. These and other input devices are often connected to the processing unit 620 through a user input interface 660 that is coupled to the system bus, but may be connected by other interface and bus structures, such as a parallel port, game port, or a universal serial bus (USB). A monitor 691 or other type of display device is also connected to the system bus 621 via an interface, such as a video interface 690. In addition to the monitor 691, computers may also include other peripheral output devices such as speakers 697 and printer 696, which may be connected through an output peripheral interface 695.

The computing system 600 may operate in a networked environment using logical connections to one or more remote computers, such as a remote computer 680. The remote computer 680 may be the voicemail system 132, a personal computer, a server, a router, a network PC, a peer device, or other common network node, and typically includes many or all of the elements described above relative to the computing device 610, although only a memory storage device 681 has been illustrated in FIG. 6. The logical connections depicted in FIG. 6 include a local area network (LAN) 671 and a wide area network (WAN) 673, but may also include other networks such as a personal area network (PAN) (not shown). Such networking environments are commonplace in offices, enterprise-wide computer networks, intranets, and the Internet.

When used in a LAN networking environment, the computing system 600 is connected to the LAN 671 through a network interface or adapter 670. When used in a WAN networking environment, the computing device 610 typically includes a modem 672 or other means for establishing communications over the WAN 673, such as the Internet. The modem 672, which may be internal or external, may be connected to the system bus 621 via the user input interface 660, or via another appropriate mechanism. In a networked environment, program modules depicted relative to the computing device 610, or portions thereof, may be stored in a remote memory storage device. By way of example, and not limitation, FIG. 6 illustrates remote application programs 685 as residing on memory device 681. It will be appreciated that the network connections shown are example and other means of establishing a communications link between the computers may be used.

In the description that follows, certain examples may be described with reference to acts and symbolic representations of operations that are performed by one or more computing devices, such a computing device 610 of FIG. 6. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an example is being described in the foregoing context, it is not meant to be limiting as those of skill in the art will appreciate that the acts and operations described hereinafter may also be implemented in hardware.

Thus, FIG. 6 illustrates an example of a suitable environment on which a voicemail to media mail forwarding system may be implemented. The computing system 600 of FIG. 6 is an example of a suitable environment and is not intended to suggest any limitation as to the scope of use or functionality of an example. Neither should the environment be interpreted as having any dependency or requirement relating to any one or combination of components illustrated in an example operating environment.

Examples may be implemented with numerous other general-purpose or special-purpose computing devices and computing system environments or configurations. Examples of well-known computing systems, environments, and configurations that may be suitable for use with an example include, but are not limited to, personal computers, server computers, hand-held or laptop devices, personal digital assistants, cell phones, wireless communications devices, wireless communications devices that may include an image capture, device, multiprocessor systems, microprocessor-based systems, set top boxes, programmable consumer electronics, network, minicomputers, mainframe computers, and distributed computing environments that include any of the above systems or devices.

Examples may be described in a general context of computer-executable instructions, such as program modules, being executed by a computer. Generally, program modules include routines, programs, objects, components, data structures, etc., that perform particular tasks or implement particular abstract data types. An example may also be practiced in distributed computing environments where tasks are performed by remote processing devices that are linked through a communications network. In a distributed computing environment, program modules may be located in both local and remote computer storage media including memory storage devices.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the examples of the invention.

What is claimed is:

1. A method comprising:
   receiving a stream of voicemail audio data associated with a voicemail message created by a first user;
   generating a text-based representation of a portion of the stream of voicemail audio data;
   generating one or more identification tags, including a priority status tag, associated with the stream of voicemail audio data from at least one of the stream of voicemail data and the text-based representation of the portion of the stream of voicemail data and metadata based on input entered by the first user;
   providing the text-based representation of the portion of the stream of voicemail data and the one or more identification tags to a second user through a graphical user interface;
   providing a subject identification tag based on the metadata based on input entered by the first user and associated with the stream of voicemail audio data to the second user through the graphical user interface; and
   prioritizing the text-based representation of the portion of the stream of voicemail audio data provided to the user through the graphical user interface with respect to other text-based representations of voicemail audio data that are provided to the user through the graphical user interface, wherein the prioritization is based on the priority status tag associated with the stream of voicemail audio data and priority status tags associated with the other text-based representations of voicemail audio data.

2. The method of claim 1, further comprising prompting the first user to input an identification tag selected from the group consisting of: a name, a subject, and a return phone number.

3. The method of claim 1, wherein generating the text-based representation of a portion of the stream of voicemail audio data comprises automatically generating the text-based representation of the portion of the stream of voicemail audio data with a speech recognition program.

4. The method of claim 1, further comprising determining if the text-based representation of the portion of the stream of voicemail audio data includes information about any one of a name of the first user, a subject identification tag of the voicemail message, a time associated with the voicemail message, and a phone number associated with the first user.

5. The method of claim 1, further comprising:
   associating a subset of the text-based representation of the portion of the stream of voicemail audio data or the one or more identification tags with information in a database of names and contact information for people with whom the second user has interacted; and
   providing additional information from the database to the second user through the graphical user interface based on the association between the subset of the text-based representation of the portion of the stream of voicemail audio data or the one or more identification tags and the information in the database.

6. The method of claim 1, further comprising providing the text-based representation of the portion of the stream of voicemail audio data and the one or more identification tags through an electronic message system.

7. The method of claim 1, further comprising:
   providing a name of a person associated with the stream of voicemail audio data to the second user through the graphical user interface.

8. The method of claim 1, further comprising providing the text-based representation of the portion of the stream of voicemail audio data on a display, the text-based representation of the portion of the stream of voicemail audio data including a return phone number related to the stream of voicemail audio data and/or a date and time related to the stream of voicemail audio data.

9. The method of claim 1, further comprising:
providing a plurality of formats for the text-based representation of the portion of the stream of voicemail audio data, a related video or image data, the one or more identification tags, and/or the stream of voicemail audio data; and
providing for a user to choose one or more of the formats.

10. The method of claim 1, further comprising:
prioritizing of one or more components of the text-based representation of the portion of the stream of voicemail audio data;
sorting the one or more components based on the prioritization; and
displaying the one or more components in the graphical user interface on a display.

11. The method of claim 1, wherein the metadata received from the first user includes a subject of the content of the voicemail stream.

12. The method of claim 1, further comprising automatically assigning the priority status tag based on information in the text-based representation.

13. The method of claim 1, further comprising determining the priority status tag by the first user based on a response by the first user to a voice prompt.

14. The method of claim 1, further comprising determining the priority status tag by the second user based on an association by the second user of a phone number from which the voicemail audio data originates with a priority status.

15. The method of claim 1, further comprising:
determining a name of the first user;
displaying the name of the first user in association with the text-based representation in the graphical user interface;
associating a name-determination icon with the text-based representation, the name-determination icon indicating whether the name of the first user was determined based on a response of the first user to a voice prompt, or whether the name of the first user was determined based on the voicemail audio data.

16. A system comprising:
a processor configured for (i) receiving a stream of voicemail audio data associated with a voicemail message created by a first user, (ii) generating a text-based representation of a portion of the stream of voicemail audio data, (iii) generating one or more identification tags, including a priority status tag, associated with the stream of voicemail audio data from at least one of the stream of voicemail data and the text-based representation of the portion of the stream of voicemail data and metadata the first user, (iv) prioritizing the text-based representation of the portion of the stream of voicemail audio data provided to the user through the graphical user interface with respect to other text-based representations of voicemail audio data that are provided to the user through the graphical user interface, wherein the prioritization is based on the priority status tag associated with the stream of voicemail audio data and priority status tags associated with the other text-based representations of voicemail audio data; and
a graphical user interface configured for providing the text-based representation of the data and the one or more identification tags to a second user and for providing a subject identification tag based on the metadata based on voice or audio input entered by the first user and associated with the stream of voicemail audio data to the second user through the graphical user interface.

17. The system of claim 16, wherein a processor is further configured for running a speech recognition program for creating the text-based representation from the voicemail audio data.

18. The system of claim 16, wherein the graphical user interface further comprises a section associated with at least one of the one or more identification tags.

19. The system of claim 16, further comprising:
a database configured for storing information for association with a subset of the text-based representation of the portion of the stream of voicemail audio data.

20. The system of claim 16, further comprising:
a database configured for storing information for association with a subset of the text-based representation of the portion of the stream of voicemail audio data, and wherein the processor is further configured to provide additional text-based information to the user through the graphical user interface to the second user based on an association between the subset of the text-based representation and information in the database.

21. The system of claim 16, wherein the metadata received from the first user relates to includes subject of the content of the voicemail stream.

22. A tangible computer-readable storage medium comprising computer-executable instructions for causing a computer to:
receive a stream of voicemail audio data associated with a voicemail message created by a first user;
generate a text-based representation of a portion of the stream of voicemail audio data;
obtain one or more identification tags from at least one of the stream of voicemail data and the text-based representation of the portion of the stream of voicemail data and metadata the first user;
provide the text-based representation of the portion of the stream of voicemail data and the one or more identification tags to a second user through a graphical user interface;
provide a subject identification tag based on the metadata the first user and associated with the stream of voicemail audio data to the second user through the graphical user interface; and
prioritize the text-based representation of the portion of the stream of voicemail audio data provided to the user through the graphical user interface with respect to other text-based representations of voicemail audio data that are provided to the user through the graphical user interface, wherein the prioritization is based on the priority status tag associated with the stream of voicemail audio data and priority status tags associated with the other text-based representations of voicemail audio data.

23. The computer-readable program of claim 22, further comprising computer-executable instructions for causing the computer to prompt the first user to input an identification tag selected from the group consisting of: a name, a subject, and a return phone number.

24. The computer-readable program of claim 22, further comprising computer-executable instructions for causing the computer to:
associate a subset of the text-based representation of the portion of the stream of voicemail audio data or the one or more identification tags with information in a database of names and contact information for people with whom the second user has interacted; and
provide additional information from the database to the second user through the graphical user interface based on the association between the subset of the text-based representation of the portion of the stream of voicemail audio data or the one or more identification tags and the information in the database.

* * * * *